United States Patent [19]
Dobler et al.

[11] Patent Number: 5,582,510
[45] Date of Patent: Dec. 10, 1996

[54] ASSEMBLY FOR FEEDING FUEL FROM A SUPPLY TANK TO AN INTERNAL COMBUSTION ENGINE

[75] Inventors: Klaus Dobler; Michael Huebel, both of Gerlingen, Germany

[73] Assignee: Robert Bosch GmbH, Stuttgart, Germany

[21] Appl. No.: 544,957

[22] Filed: Oct. 18, 1995

[30] Foreign Application Priority Data

Oct. 19, 1994 [DE] Germany .................... 44 37 317.1

[51] Int. Cl.$^6$ ........................................ F04B 17/00
[52] U.S. Cl. ........................ 417/423.7; 123/497
[58] Field of Search .................... 123/497, 495; 417/423.7, 366, 368

[56] References Cited

U.S. PATENT DOCUMENTS

| | | | |
|---|---|---|---|
| 4,566,866 | 1/1986 | Kemmner | 417/423.7 |
| 5,013,221 | 5/1991 | Tuckey | 417/423.7 |
| 5,053,664 | 10/1991 | Kikuta | 417/423.7 |
| 5,088,900 | 2/1992 | Yoshioka | 417/423.7 |
| 5,141,410 | 8/1992 | Fujii | 417/423.7 |
| 5,283,494 | 2/1994 | Frank | 419/423.7 |
| 5,356,272 | 10/1994 | Nagata | 417/423.7 |

*Primary Examiner*—Carl S. Miller
*Attorney, Agent, or Firm*—Edwin E. Greigg; Ronald E. Greigg

[57] ABSTRACT

An assembly for feeding fuel from a supply tank to an internal combustion engine, with a fuel feed pump which is driven in rotation by an electric drive motor arranged together with the feed pump in a common housing. For the pump-side axial mounting of the rotor of the drive motor, there is provided, between the rotor and an intermediate housing of the feed pump, a hydrodynamic bearing which is formed by recesses in the end faces of the rotor and/or intermediate housing, these end faces being located opposite and essentially parallel to one another so as to form an annular gap.

6 Claims, 1 Drawing Sheet

ASSEMBLY FOR FEEDING FUEL FROM A SUPPLY TANK TO AN INTERNAL COMBUSTION ENGINE

STATE OF THE ART

The invention proceeds from an assembly for feeding fuel from a supply tank to an internal combustion engine. In a feed assembly of this type, known from German Utility Model 89 14 996.3, an electric drive motor drives in rotation a fuel feed pump arranged in a common housing. The drive motor, connected to an impeller of the feed pump in a way not shown in more detail, comprise a stator fixed relative to the housing and a rotor which rotates therein and which is arranged on a housing-mounted rotor shaft. The axial forces acting on the rotor of the drive motor, such as, for example, the spring forces of the axially arranged brushes on the end commutator and magnetic forces, are absorbed and supported in known feed assemblies of the generic type by a stop plate in the suction cover of the feed pump, thus resulting, as a consequence of the mechanical friction of the rotor shaft, in increased wear and, particularly, a high noise emission of the feed assembly as a whole.

ADVANTAGES OF THE INVENTION

In contrast to this, the advantage of the feed assembly according to the invention, is that, as a result of the hydrodynamic mounting between the rotor of the electric drive motor and the intermediate housing of the feed pump, a low-wear and low-noise mounting of the rotor in the axial direction is possible in a constructively simple way. At the same time, it is particularly advantageous to perform this mounting between the intermediate housing having the outlet orifice of the feed pump and the opposite end face of the rotor, since, there, the fuel can flow into the gap between the rotor and intermediate housing without flow obstructions. Moreover, no connecting components, such as, for example, a commutator, are provided on these end faces, so that their machining does not influence the construction of the known feed assemblies, thereby also making a retrofitting of known types of feed assembly possible, where appropriate. The buildup of the hydrodynamic wedge between the fixed intermediate housing of the feed pump and the slightly axially displaceable rotor of the drive motor takes place by means of recesses in at least one of the end faces of the rotor and intermediate housing, which recesses are filled with fuel during the operation of the feed assembly, as a result of the fuel drag flow generated by the rotating rotor in the gap between the rotor and intermediate housing, and thus build up a pressure force acting axially relative to the rotor.

At the same time, the recesses can have the most diverse geometrical shapes, but it is particularly advantageous to design the recesses in the form of groove patterns, so as, during the rotation of the rotor, to build up a hydrodynamic lubricating film between the end faces of the rotor and intermediate housing, which lubricating film on the other hand prevents the rotor loaded by the axial brush springs of the end commutator from running on the wall of the intermediate housing.

Alternatively, particularly with a view to retrofitting on known feed assemblies, it is also possible to arrange the end-face recesses in an intermediate disk which is then inserted into the gap between the rotor and intermediate housing.

By the design of the angles of inclination of the spiral grooves in the radial direction and a possible inclination relative to the end face, the pressure forces of the hydrodynamic film can be coordinated with the axial forces introduced at the rotor.

It is thus possible, by simple constructive means, to avoid the mechanical friction of the rotor shaft at its feed-pump-face end with a support plate, and this support plate can thereby be dispensed with completely.

Further advantages and advantageous embodiments of the subject of the invention can be taken from the description, the drawing and the claims.

BRIEF DESCRIPTION OF THE DRAWING

An exemplary embodiment of the assembly according to the invention for feeding fuel is illustrated in the drawing and is explained in more detail in the following description.

DESCRIPTION OF THE EXEMPLARY EMBODIMENT

Figure 1:
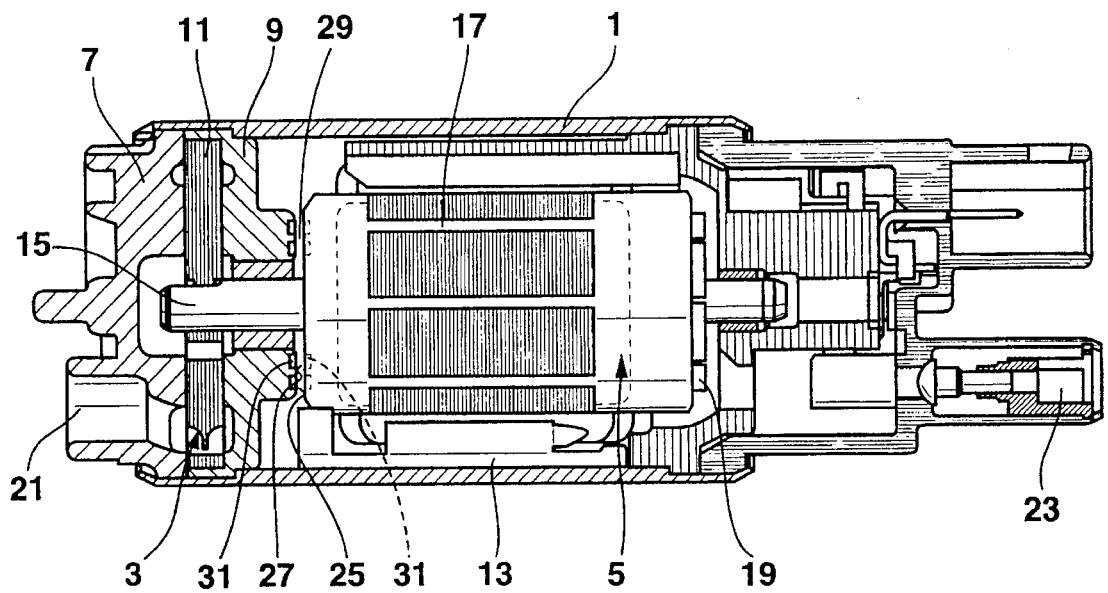
FIG. 1 shows a section through the feed assembly, from which particularly the position of the recesses forming the hydrodynamic bearing can be taken.

The description of the exemplary embodiment of the feed assembly according to the invention illustrated in FIG. 1 is restricted to the components essential to the invention, since the design of the remaining components and subassemblies is sufficiently known from the state of the art for fuel feed assemblies.

Thus, there is inserted into the common housing 1 of the feed assembly shown in FIG. 1 a feed pump 3 which is driven in rotation by an electric drive motor 5 likewise mounted in the housing 1.

At the same time, in the exemplary embodiment, the feed pump 3 is designed as a flow pump with a suction cover 7 closing off the housing 1 relative to the outside, with an intermediate housing 9 to the remaining part of the feed assembly and with an impeller 11 rotating in a pump chamber formed between the suction cover 7 and intermediate housing 9, but other types of pump are also possible alternatively to this.

The electric drive motor 5 driving the feed pump 3 in rotation is formed from a stator 13 which has magnetic segments and is fastened by means of its outer circumference to the housing 1 and in which rotates a rotor 17 guided on a housing-mounted rotor shaft 15. This rotor 17 has, in a known way, rotor windings which are introduced into the basic body of the rotor 17, the said basic body preferably being made of plastic, in such a way that individual axial segments can be loaded alternately with an electrical potential. This alternate current flow takes place in a known way via an end commutator 19 which is arranged on the end face of the rotor 17 facing away from the feed pump 3 and on which bear two brushes, not shown in more detail, which are loaded with different electrical potentials and which are held in axial bearing contact on the end commutator 19 via brush springs. Analogously to this, an electric drive motor of another type can also be used for driving the feed assembly according to the invention.

In the exemplary embodiment, the transmission of the rotational movement of the rotor 17 of the electric drive motor 5 to the impeller 11 of the feed pump 3 during the operation of the feed assembly, that is to say when current flows through the brushes, takes place via the rotor shaft 15 which projects positively into the impeller 11 and which thus makes a rotationally fixed connection with the latter. The fuel feed by the feed pump 3 takes place in a known way, in that fuel flows out of a supply tank via a suction orifice 21 in the suction cover 7 into the pump chamber of the feed pump 3, is fed there by the impeller 11, with an increase in pressure, to a delivery orifice in the intermediate housing 9, passes from there into the interior of the housing 1, flows through the latter along the electric drive motor 5 and emerges from the housing 1 at a delivery or outflow connection 23 into a feed conduit to the internal combustion engine.

While the feed assembly is in operation, various forces, such as, for example, magnetic forces, forces of the brush springs, etc., act with axial components on the rotor 17 of the electric drive motor 5, so that this has to be supported axially, the axial support in the direction facing away from the feed pump 3 taking place mainly by means of the brush springs.

In the direction of the feed pump 3, the axial support of the rotor 17 takes place in a way according to the invention by the provision of a fuel film, acting as a hydrodynamic bearing, in an annular gap 29 formed between the pump-facing end face 25 of the rotor 17 and the rotor-facing end face 27 of the feed pump 3, said end face 27 being arranged essentially parallel to said end face 25. At the same time, in order to form the hydraulic wedge in the annular gap 29, recesses 31 are made in the end faces 25 and 27, and alternatively a one-sided arrangement in only one of the end faces 25, 27 is also possible.

Figure 2:
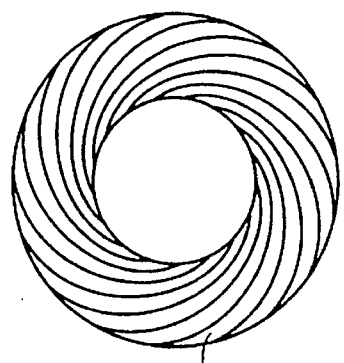
FIGS. 2 to 4 show different possibilities for designing the spiral grooves in the end faces of the rotor of the drive motor and/or the intermediate housing of the feed pump.
Figure 3:
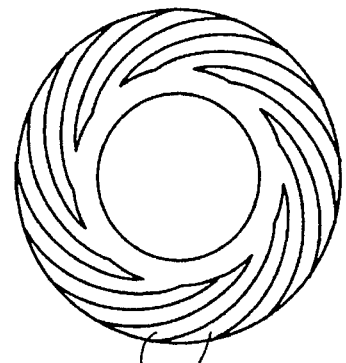
Figure 4:
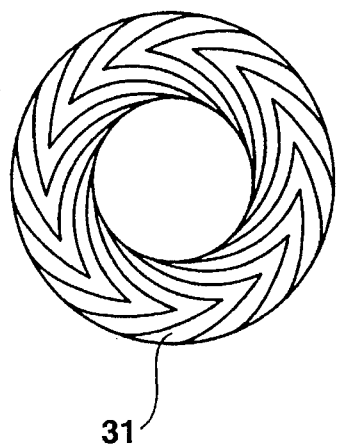

In the exemplary embodiment, these recesses 31 are designed as spiral grooves, the shape of which is shown in FIGS. 2 to 4 in three versions selected by way of example.

Thus, the groove-shaped recesses 31 in FIG. 2 extend continuously from the radially outer region into a radially inner region adjacent to the rotor shaft 15, and a step projecting inwards from the end faces 25, 27 can be provided for a better throughflow of fuel through the recesses 31.

In the design version shown in FIG. 3, the spiral recesses 31 are guided from the radially outer region into a radially inner region, but do not open out at an inner end edge of the end faces 25, 27. In the design version shown in FIG. 4, the recesses 31 leading from the radially outer to the radially inner edge of the end faces 25, 27 are in each case divided into a radially inner and a radially outer part region which are curved in the direction of flow of the fuel and which meet in approximately the radial center of the end faces 25, 27 so as to form an acute angle.

At the same time, the base faces of the recesses 31 in all the design versions are preferably inclined relative to the end faces 25, 27 in such a way that their cross section decreases in the direction of flow of the inflowing fuel.

The buildup of the hydraulic wedge, axially stabilizing and guiding the rotor 17, in the annular gap 29 takes place in the following way.

With the rotation of the rotor 17 of the electric drive motor 5 in the fuel-filled housing 1 of the feed assembly, the pressure drag flow known from lubricant flow occurs in the annular gap 29 along the groove center axis of the recesses 31. There thereby forms along the recesses 31 a pressure profile with a resultant pressure force which counteracts a possible axial force on the rotor 17. The pumping of the fuel into the recesses 31 is essential for maintaining this pressure drag flow, this being ensured by their spiral arrangement. The pumping effect for the pressure buildup can be influenced by the radial angle of inclination of the recesses between the groove axis and the local speed vector in the circumferential direction in the annular gap 29. The pressure buildup is optimum when this angle of inclination is the same on all radii, and this could ideally be implemented by a logarithmic spiral.

At the same time, it is possible to vary the local pressure effect in coordination with the axial forces introduced at the rotor 17 both by means of the radial angle of inclination and by means of the geometrical design of the recesses 31, so that an optimum axial stabilization of the rotor 17 (which appreciably influences its quiet running) and axial mounting is possible.

For this purpose, asymmetric designs of the groove pattern of the recesses 31 can also be formed.

Thus, by means of the feed assembly according to the invention, an axial mounting and stabilization of the rotor 17 of the electric drive motor 5 is possible in a constructively simple way, without mechanical contact of the pump-face rotor end or rotor-shaft end on the housing.

The foregoing relates to preferred exemplary embodiments of the invention, it being understood that other variants and embodiments thereof are possible within the spirit and scope of the invention, the latter being defined by the appended claims.

We claim:

1. An assembly for feeding fuel from a supply tank to an internal combustion engine, which comprises a feed pump (3), said feed pump is driven in rotation by an electric drive motor (5) arranged together in a common housing (1), said motor is formed from a stator (13) fixed to the housing and from a rotor (17) that rotates within said housing on a rotor shaft (15), an annular gap (29) being formed between a first end face (27) of an intermediate housing (9) forming a housing part of the feed pump (3) and an axial second end face (25) of the rotor (17) of the electric drive motor (5), said first end face (27) being located opposite said second end face (25) with said second end face (25) limiting the annular gap (29), a plurality of recesses are provided in the second end face (25) of the rotor (17) of the electric drive motor (5) and/or recesses are provided in the first end face (27) of the intermediate housing (9) of the feed pump (3), during an operation of the feed assembly said recesses (31) are filled with fuel in such a way that they form a hydraulic wedge, axially stabilizing the rotor (17) of the drive motor (5).

2. The assembly as claimed in claim 1, wherein the recesses (31) are designed as spiral grooves.

3. The assembly as claimed in claim 2, wherein at least the radially outward-facing ends of the recesses (31) are connected to a fuel-filled pressure space within the housing (1) of the feed assembly, said pressure space being adjacent to the intermediate housing (9).

4. The assembly as set forth in claim 1 wherein said recesses are formed only on said second end face (25) of said rotor (17).

5. The assembly as set forth in claim 1 wherein said recesses are formed only on said first end face (27) of the intermediate housing.

6. The assembly as set forth in claim 1 wherein said recesses are formed on said second end face (25) of said rotor (17) and on said first end face (27) of said intermediate housing.

* * * * *